Feb. 10, 1959 L. E. PEPPERBERG 2,873,361

RADIO RECEIVER

Filed April 4, 1956

INVENTOR.
LOUIS E. PEPPERBERG
BY Mueller & Aichele
Attys.

United States Patent Office 2,873,361

Patented Feb. 10, 1959

2,873,361

RADIO RECEIVER

Louis E. Pepperberg, Highland Park, Ill., assignor to Motorola, Inc., Chicago, Ill., a corporation of Illinois Application April 4, 1956, Serial No. 576,026

8 Claims. (Cl. 250—20)

Figure 1:
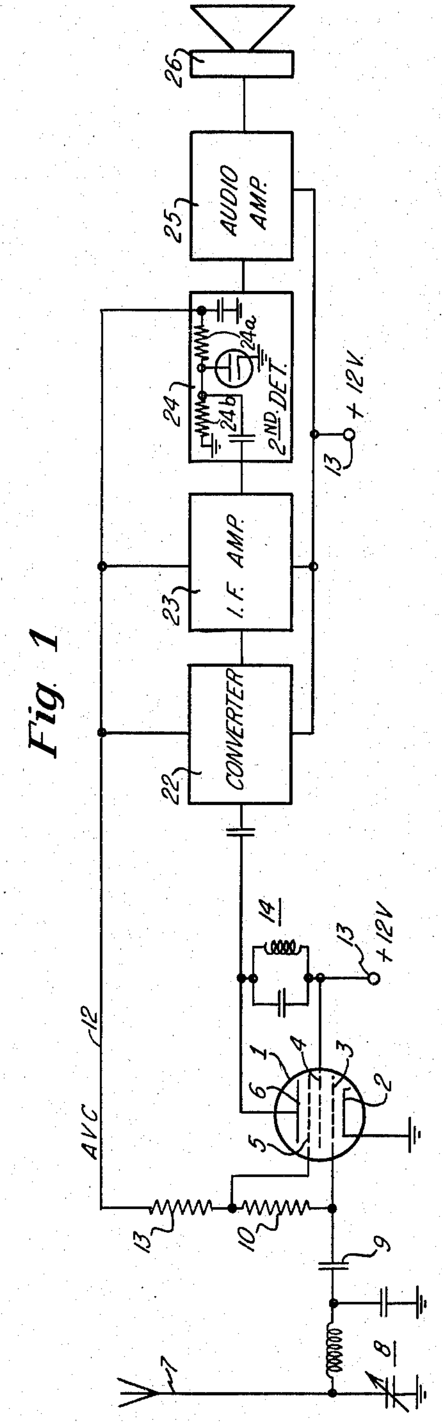

This invention relates to radio receivers and more particularly to radio frequency amplifiers as used in such receivers.

Various radio receivers have been proposed in the past which operate directly from a low voltage potential such as 12 to 15 volts and which do not use any direct current voltage increasing apparatus. A receiver of this type, suitable for use in an automobile having a 12 volt electrical system, is disclosed in the application of Richard T. Race, Serial No. 535,948 and filed September 22, 1955.

One difficulty with this type of receiver, however, is that there may be great variation of input signal level from an associated antenna since the auto may be at times very near or very far from the transmitter of a given station. In a receiver having low voltage on the anode of the radio frequency amplifier, this would mean that a signal impressed thereon might be comparatively weak or quite strong, and even a great percentage of the anode voltage. For example, if the antenna signal is one volt and a tuned circuit in the radio frequency amplifier input gives a gain of eight, there will be an eight volt signal impressed on the input grid of the amplifier tube and this obviously is a very large signal compared to the 12 to 15 volt anode potential. Under such conditions there very well can be intolerable distortion of the signal. This indicates desirability of reducing the input to the receiver but on the other hand, it is also desirable to make use of all the gain available when receiving weak signals. In the prior art, of course, automatic gain control systems have been used to control the gain of a radio frequency amplifier but it has been found that in a receiver of the above mentioned type conventional automatic gain control systems are not "stiff" enough, that is, they do not provide a sufficiently wide variation in gain to overcome the difficulties mentioned.

An object of the present invention is to provide a new and improved automatic volume control system.

Another object of the invention is to provide an improved automatically controlled radio frequency amplifier for low plate voltage receivers.

A further object of the invention is to provide a new and improved means to reduce overload distortion in a vacuum tube system operating at high signal levels and having only 12 volt plate voltage.

Another object of the invention is to provide a new and improved automobile radio circuit operating from low plate voltage for handling large changes in signal intensity.

A feature of the invention is the provision of a new and improved automatic volume control system for automobile radio receivers having low plate voltage wherein the automatic volume control potential is applied to the control and suppressor grids of the radio frequency amplifier tube in such manner that the control grid and cathode will act as a diode adding to the automatic volume control bias signal, for radio frequency signals exceeding a predetermined amount.

Another feature of the invention is the provision of a new and improved radio receiver which is capable of handling large variations in the radio frequency signal which includes a radio frequency amplifier with automatic volume control bias applied to the control and suppressor grids thereof in such manner that the control grid and cathode of the tube act as a diode and add to the AVC signal for greater than normal values of radio frequency signal, and in which extremely large values of radio frequency signal will cut off the radio frequency amplifier, with the radio frequency signal then being coupled to the next stage through the capacity between the plate and the suppressor grid of the radio frequency amplifier tube.

Figure 2:
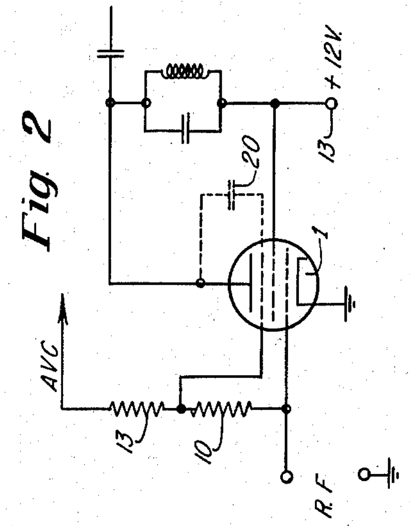

These and other objects and features of the invention will be apparent from the following description when considered with the accompanying drawings in which:

Fig. 1 is a schematic diagram of a radio receiver including the radio frequency amplifier in accordance with the invention with the remainder of the receiver shown in block diagram; and Fig. 2 is a schematic diagram of an embodiment of the amplifier of Fig. 1 illustrating operation when the amplifier tube is cut off.

In accordance with the present invention a radio receiver is provided having a radio frequency amplifier which operates at low plate potential and handles signals varying through a very wide range of signal levels. An automatic volume control bias from the second detector is applied to the control and suppressor grids of the radio frequency amplifier through suitable resistors to control the gain thereof. When the radio frequency signal exceeds a certain amount, such that the amplifier grid draws current, this rectifier current creates a bias voltage in addition to the automatic volume control voltage available from the second detector, to further reduce the gain of the radio frequency amplifier. At a further predetermined increase in radio frequency signals, the radio frequency amplifier tube is cut off by the rectified grid current bias, and the radio frequency signal is coupled directly to the next stage through the capacity between the plate and the suppressor grid of the radio frequency amplifier tube.

Referring now to the drawings in Fig. 1 there is shown a schematic circuit diagram of a radio receiver including a radio frequency amplifier comprising a pentode vacuum tube 1, having a cathode 2, a control grid 3, a screen grid 4, a suppressor grid 5, and a plate 6. Radio frequency energy is received on the antenna 7 and coupled by means of the tuned circuit 8 and capacitor 9 to the control grid 3. The output of the radio frequency amplifier tube 1 is selected by circuit 14 and applied to converter 22 which heterodynes the signal to intermediate frequency. The intermediate frequency signal is amplified in amplifier 23 and detected in second detector 24. The second detector 24 also provides an automatic gain (or volume) control voltage on line 12 for application to the radio frequency amplifier 1, converter 22 and intermediate frequency amplifier 24. The detected audio signal is amplified in audio amplifier 25 and reproduced in speaker 26. Plate voltage for the entire receiver may be provided at terminal 13.

Considering now the radio frequency amplifier, the grid 3 and suppressor 5 of the tube 1 are connected by a resistor 10 to provide a D. C. and R. F. path therebetween. Cathode 2 is connected to ground. The automatic volume control bias signal, negative with respect to ground and derived from a second detector 24, is applied via the bus 12 and a resistor 13 to the suppressor grid 5. The automatic volume control bias signal is also fed through the resistor 10 to the control grid 3. A D. C.

path to ground for grid 3 is provided by resistors 24a and 24b coupled to one end of resistor 13 and to ground in detector 24. The plate voltage for the tube 1 is supplied by the terminal 13, which may be connected to the automobile battery in a 12 volt automobile electrical system. The radio frequency signal is selected and coupled from the plate of the radio frequency amplifier 1 to the converter 22 by the coupling circuit 14.

The operation of the system will be discussed in connection with both Fig. 1 and Fig. 2. Considering first the direct current operation, when the input level is below a predetermined amount, for example, .2 volt of radio frequency, the automatic volume control system operates in the normal way with the second detector 11 supplying a negative automatic volume control bias which reduces the gain of the radio frequency stage. When the radio frequency signal begins to exceed a predetermined amount (.2 volt), the control grid of the radio frequency amplifier will begin to act as a diode plate, and charge capacitor 9 through the capacitors of circuit 8 wihch are coupled between capacitor 9 and ground, thereby causing a voltage to be developed at grid 3 which adds to the automatic volume control bias supplied by the second detector. It has been found that with a radio frequency input level of about 1 volt this action of the grid as a diode raises the automatic volume control potential to a level of approximately 12 volts which is about 6 volts more than may be obtained from the second detector alone as a source of automatic volume control bias.

Now, consider the alternating current operation. At less than normal input signal level, for instance .2 volt, the input signal is controlled by the automatic volume control bias applied to the amplifier tube. When the tube is conducting normally the radio frequency signal applied to the suppressor grid through the resistor 10, has very little effect because the transconductance (*gm*) of the suppressor grid is very low compared to that of the control grid.

For radio frequency signals of greater strength the control grid acts as a rectifier, as mentioned above, and adds a potential to the system automatic volume control bias. As the radio frequency signal increases in intensity a point is reached when the tube is virtually cut off by the bias developed through the diode action of the grid. The amplifier tube may be cut off at a bias of the order of 6 volts, for example. When the tube is cut off, the radio frequency signal which is directly connected to the suppressor grid is coupled through the interelectrode capacity 20 (Fig. 2) between the plate and the suppressor grid of the tube and applied to the succeeding stage. The radio frequency signal is now connected through the series circuit including resistor 10 and the capacity 20 between the plate and suppressor grid, which is of the order of 8 to 10 micromicrofarads. The impedance of this connection causes a phase difference between the R. F. voltage input and the R. F. voltage output of the amplifier, of about 12°. When the amplifier operates normally there is a voltage phase difference of about 180° between input and output. This phase transition takes place with between .2 and .3 volt of R. F. input. There is also an attenuation of the R. F. signal by resistor 10 and capacitor 20 which helps to prevent the R. F. signal from overloading the next stage.

The different modes of operation may be controlled at predetermined levels of radio frequency signal intensity by choosing the values of the resistors 10 and 13, and other components for the type tube and automatic volume control bias used. Of course, the R. C. time in each portion of the AGC system is made short enough to follow changes in carrier strength of a received signal but too long to follow amplitude modulation of the carrier. In one embodiment of the invention resistor 13 had a value of 1000 ohms and resistor 10 had a value of 100,000 ohms. With these values the tube for instance, a 12BD6 type, operates normally below .2 volt of radio frequency signal. For signals exceeding .2 volt the grid and cathode act as a diode providing additional automatic volume control bias to the other stages. For signals between .3 and 1 volt, the grid bias cuts off the tube and the signal is coupled through to the converter unamplified.

It is to be pointed out that the interelectrode capacity between the suppressor grid and the plate of the amplifier tube is also effective when the tube is not cut off. Under such conditions, a portion of the input signal at the suppressor grid is coupled through the capacity between the suppressor and plate to reduce distortion. This signal is nearly 180° out of phase with the amplified signal and cancels a portion of the amplified signal thereby reducing distortion. External capacity between the suppressor and plate may be desirable in certain applications to increase this cancellation effect and to increase the feed through coupling when the tube is cut off.

It is therefore seen that a radio frequency amplifier is provided which operates at low plate voltage and still effectively handles signals which may be large compared to the plate voltage. The amplifier first supplements the automatic volume control voltage to provide a wider range of control and then cuts off the tube and effectively bypasses a portion of the high level signal through the tube. The bypass provided by the suppressor grid-plate capacity is also effective to reduce distortion in the amplifier at high signal levels.

I claim:

1. In a radio receiver which includes a source of automatic gain control bias, the combination of a radio frequency amplifier tube of the pentode type having a cathode, an anode and control, screen and suppressor grids, resistor means connecting said control grid to said suppressor grid, means including capacitor means coupled between said control grid and said cathode for applying a radio frequency signal to said control grid and through said resistor means to said suppressor grid, means for applying the automatic gain control bias to said suppressor grid and through said resistor means to said control grid, said control grid and said cathode forming a rectifier when said radio frequency signal reaches a predetermined value to increase the automatic gain control bias and reduce the gain of said tube.

2. In a radio receiver which includes a source of automatic gain control bias and which operates directly from the potential of the order of 12 volts and, the combination of a radio frequency amplifier tube of the pentode type having a cathode, an anode and control, screen and suppressor grids, said anode and said suppressor grid having a predetermined capacity therebetween, means applying a direct current potential to said anode and said screen grid, resistor means connecting said control grid to said suppressor grid, means including capacitor means coupled between said control grid and said cathode for applying a radio frequency signal to said control grid and through said resistor means to said suppressor grid, means for applying the automatic gain control bias to said suppressor grid and through said resisitor means to said control grid, said control grid and said cathode forming a rectifier when said radio frequency signal reaches a predetermined value to increase the automatic gain control bias and reduce the gain of said tube so that increase of said bias with increase of the level of said radio frequency signal virtually cuts off said tube and the radio frequency signal applied to said suppressor grid is coupled to said anode through the capacity therebetween to provide said signal at said anode.

3. In a radio receiver operating directly from a potential of the order of 12 volts, the combination of a radio frequency amplifier with an amplifier tube having a cathode, an anode and control, screen, and suppressor grids, said anode and said suppressor grid being positioned to establish a given interelectrode capacity therebetween, an input circuit for said tube to supply a radio frequency signal to said control grid, said input circuit including parallel-connected resistor and capacitor means coupled between said control grid and said cathode to provide rectifier action therebetween so that grid current is drawn into said capacitor means for virtual cutoff of said tube at high input signal levels, an output circuit coupled to said anode, and means coupling said input circuit to said suppressor grid so that the radio frequency signal is applied thereto and through said interelectrode capacity to said anode and output circuit when said tube is virtually cut off.

4. In a radio receiver operating directly from a potential from the order of 12 volts, the combination of a radio frequency amplifier with an amplifier tube having a cathode, an anode and control, screen, and suppressor grids, said anode and said suppressor grid being positioned to establish a given interelectrode capacity therebetween, an input circuit for said tube to supply a radio frequency signal to said control grid, said input circuit including parallel connected resistor and capacitor means coupled between said control grid and said cathode to provide rectifier action therebetween so that grid current is drawn for virtual cutoff of said tube at high input signal levels, an output circuit coupled to said anode, direct current signal coupling means connecting said input circuit to said suppressor grid so that the radio frequency signal is applied thereto and through said interelectrode capacity to said anode and output circuit when said tube is virtualy cut off, and detector means for developing a gain control potential varying with the strength of the radio frequency signal, said detector means being direct current coupled to said suppressor grid for further gain control of said amplifier tube.

5. In a radio receiver of the type constructed to operate from a direct current potential source providing a potential of the order of 12 volts, said receiver including in combination, detector circuit means providing an automatic gain control potential related to the strength of a received signal, a radio frequency amplifier stage including a tube of the pentode type having a cathode, an anode, and control, screen and suppressor grids, said anode and said suppressor grid having a predetermined capacitance therebetween, anode circuit means to apply signals to further stages of said receiver including said detector circuit means, means applying a direct current potential from the potential source to said anode circuit means and to said screen grid, input circuit means including resistor means connecting said control grid to said suppressor grid to provide a direct current path therebetween and series coupled capacitor means to apply radio frequency signals to said control grid, direct current coupling means for applying said automatic gain control potential to said resistor means for controlling the gain of said tube by regulating said control and suppressor grids, said radio frequency amplifier stage being adapted to translate radio frequency signal voltages which are substantial compared to the value of the potential source, with said automatic gain control potential reducing conduction of said tube so that the radio frequency signals are translated to said anode circuit means through the capacitance, thereby to prevent overloading of the radio receiver and distortion of the radio frequency signal.

6. In a radio receiver of the type wherein the first stage thereof is subject to produce distortion of high level signals, and which receiver includes detector circuit means having a source of gain control potential negative with respect to a reference point, a radio frequency amplifier stage including a vacuum tube having a cathode and an anode and first, second, and third grids spaced in the order named between said cathode and said anode, circuit means coupled to said anode and said second grid for energizing the same and applying signals to further portions of the receiver including the detector circuit means, means connecting said cathode to the reference point, an input circuit for developing radio frequency input signals with respect to the reference point, a series circuit including capacitor means and resistor means connected between said input circuit and the source of gain control potential with said capacitor means being connected to said input circuit and said resistor means being connected to the source of gain control potential, and coupling means connecting said first and third grids to different points on said resistor means, said coupling means applying direct current and radio frequency signals from said series circuit to both said first and third grids so that the gain control potential is applied to said first and third grids and the radio frequency input signals are applied to said first and third grids.

7. A radio receiver of the type wherein the first radio frequency amplifier stage thereof is subject to translate high level signals tending to produce distortion in the receiver, said receiver including in combination, detector circuit means providing an automatic gain control potential negative with respect to a reference point, a radio frequency amplifier stage including a vacuum tube having a cathode and an anode and signal, screen and further grids, said anode and at least one of said grids having predetermined interelectrode capacitance therebetween, anode circuit means to apply signals to further stages of said receiver including said detector circuit means, means for applying a direct current energizing potential to said anode circuit means and to said screen grid, input circuit means including resistor means connecting said signal grid to said further grid to provide a direct current path therebetween and series coupled capacitor means to apply radio frequency signals to said signal grid, direct current coupling means for applying the automatic gain control potential to said resistor means for controlling the gain of said tube by regulating the potential of said signal and further grids, said radio frequency amplifier stage being subject to translate radio frequency signals which are substantial compared to the value of the energizing source for said anode circuit means, with the automatic gain control potential reducing conduction of said tube so that the radio frequency signals are translated to said anode circuit means through interelectrode capacitance in said tube, thereby preventing overloading of said receiver and distortion of signals therein.

8. The radio of claim 7, wherein said signal grid and said further grid are interconnected by first resistor means, said direct current coupling means includes second resistor means and the values of said first and second resistor means and said capacitor means are selected to provide rectification of the high level signals in said tube for self-bias thereof.

References Cited in the file of this patent

UNITED STATES PATENTS

| | | |
|---|---|---|
| 2,079,657 | Mountjoy | May 11, 1937 |
| 2,214,608 | Bull | Sept. 10, 1940 |

FOREIGN PATENTS

| | | |
|---|---|---|
| 56,446 | Norway | Apr. 20, 1936 |
| 109,335 | Australia | Dec. 21, 1939 |
| 1,060,346 | France | Nov. 18, 1953 |